May 11, 1926.

C. A. KRABBENDAM ET AL

WEIGHING DEVICE WITH CARRIER

Filed Jan. 7, 1925

Inventors
Cornelis A. Krabbendam
Pieter H. Linn
by
Attorney

Patented May 11, 1926.

1,584,380

UNITED STATES PATENT OFFICE.

CORNELIS ADRIAAN KRABBENDAM AND PIETER HENDRIK LINN, OF SOERABAIA, JAVA.

WEIGHING DEVICE WITH CARRIER.

Application filed January 7, 1925. Serial No. 950.

The invention relates to a weighing device, which is combined with a carrier and has for its purpose to have materials or articles weighed in such a manner, that the transport of same may continue practically without interruption. A device according to the present invention is of great importance e. g. for different manufactories, in which waste products are produced, which are to be transported and the weight of which be determined for getting an exact opinion about the process in use and its results.

In accordance with the said purpose the device according to the present invention comprises principally the combination of a weighing device and a carrier, the latter together with its driving force being mounted in such a manner in relation to the former, that it is possible to weigh the material or the articles concerned when supported or at the same time moved by the endless belt of the carrier. The said inventive idea may be carried into effect in several different ways e. g. with the applying of a device for a periodical interruption of the supply of the material to the carrier, which device functions in connection with means for fixing the balance of the weighing machine or cooperates with means for effectuating a periodical registration of the weight shortly after each interruption of the supply of the material.

In the drawing one single embodiment of the invention is shown by way of an example:

Figure 1:
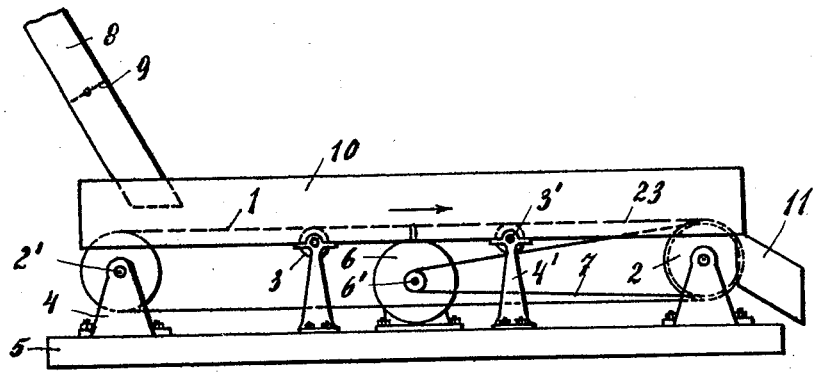
Fig. 1 is a side elevation of the carrier.

According to the drawings an endless belt 1 is provided which is lead over two rollers 2, the shafts 2' of which are rotatable in supports 4, which are in some way suitably connected to a bottomplate 5 resting on one side 12 of the balance 14. The upper part of the belt 1 is moreover supported by a number of small rollers 3, the shafts 3' of which are rotatable in bearings 4' connected by suitable means to the plate 5, which carries also a motor 6 the pulley 6' of which is connected by means of a belt 7 to one of the rollers 2.

Figure 2:
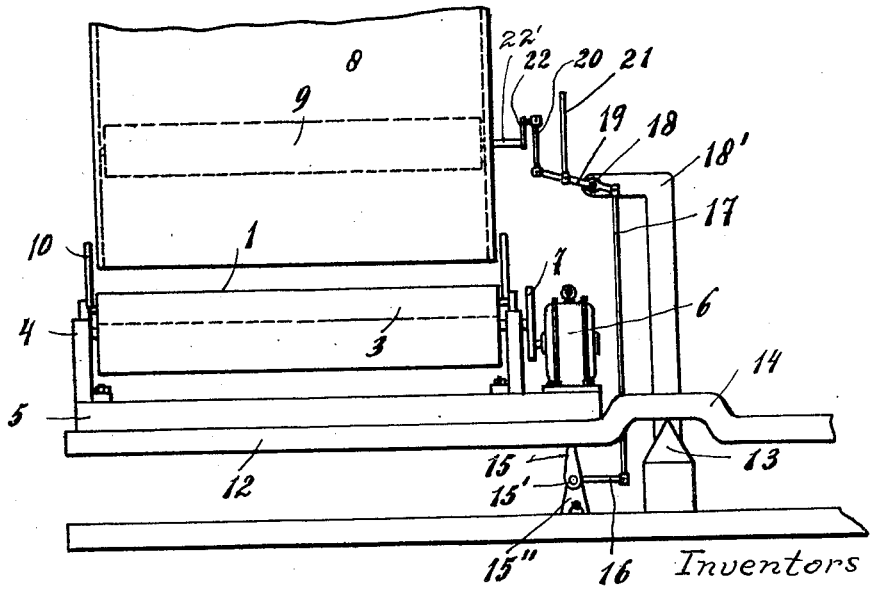
Fig. 2 is a right hand view with regard to Fig. 1, in which the balance is partly shown.

The material is supplied through a hopper 8, in which a cut-off valve 9 is arranged, and is held on the belt by guiding plates 10 which are supported by the bearings 4', whilst it is finally delivered by means of a gutter or discharge chute 11. Except the hopper 8 with valve 9 all the parts disclosed rest on a plate 12, to which one arm of the balance 14 is secured. This balance is supported by a knife 13 and may be held out of action by means of a cam 15 if same is in the position shown in Fig. 2. The cam 15 is fixed to a horizontal shaft 15' which is rotatable in a bearing 15" and carries connected thereto an arm 16 the outer end of which is journalled to a rod 17, in its turn hingedly connected to a double armed lever 19, which is rotatably arranged over a horizontal shaft 18 supported in bearings 18'. To the other arm of the lever 19 two rods 20 and 21 are journalled, the former being hingedly connected to a crank 22 fixed to the shaft 22' of the valve 9, while the latter serves as a means for actuating the said lever 19, the moving power for which may be obtained e. g. by some movable member of the device, which delivers the material to the hopper 8. Then the working of the apparatus is as follows:

The valve 9 is opened by a drawing motion of the rod 21, so that at the same time the cam 15 is placed in the position shown and consequently the balance 14 is fixed in its horizontal position. The material drops on the belt 1, which by means of the motor 6 is moved in the direction of the arrow in Fig. 1 till the front part of the material has reached a point about at 23. By means of a pulling motion of the rod 21 now the valve 9 is closed, so that no further material is supplied to the belt and at the same time the cam 15 is turned over, so that the balance 14 is released. Suitably indicating means may be used which will now indicate the weight of the material on the belt, none being shown, as such indicating means constitutes no part of the invention. Some moments thereafter the material reaches the end of its path on the belt and drops into chute 11 and about at this moment the rod 21 is drawn upwards, so that the valve 9 is opened again and at the same time the balance 14 is restored to its horizontal position, whereby the registration line indicating the weight returns to the zero position. Consequently the said registration line travels periodically over such a path, that the weight is to be read off easily. The velocity of the motor 6 is regulated in accordance with the period, in which the valve 9 is opened and closed.

Furthermore the arrangement may be such, that the whole weighing is registered and consequently the registration starts already upon the delivering of every quantity of material from the hopper to the belt. As with the second and following weighings the belt remains about equally burdened, the registration line becomes far more regular, but still the exact weight is easily read off due to the periodical additions caused by the opening and closing of the valve 9. Evidently it is advisable to have the weighing device so arranged that there may be an equilibrium when the belt 1 contains no material.

Having fully described our invention, what we claim is:

1. In a weighing device, the combination with a pivotally mounted scale beam, a driven conveyor carried on one side of said beam, a valved chute arranged to discharge onto said conveyor, and means for simultaneously opening the valve in said chute and for locking said beam in its inoperative position.

2. In a weighing device, the combination with a pivotally mounted scale beam, a conveyor carried on one side of said scale beam, a motor mounted on and movable with said beam adapted to drive said conveyor, and means for bringing said beam into its inoperative position.

3. In a weighing device the combination with a pivotally mounted scale beam, of a conveyor carried on one side of said beam adapted to drive said conveyor, a valved chute adjacent the starting end of said conveyor and means for simultaneously opening the valve in said chute and for bringing said beam into its inoperative position.

4. The combination as set forth in claim 3, and cam operated means for bringing said beam into its inoperative position.

In testimony whereof, we have signed our names to this specification.

CORNELIS ADRIAAN KRABBENDAM.
PIETER HENDRIK LINN.